United States Patent [19]

Knott et al.

[11] 4,290,566

[45] Sep. 22, 1981

[54] MAGNETIC TAPE HANDLER

[75] Inventors: John Knott, Wells; Robert V. Elliott, Westbury-sub-Mendip, both of England

[73] Assignee: EMI Limited, Hayes, England

[21] Appl. No.: 101,860

[22] Filed: Dec. 10, 1979

[30] Foreign Application Priority Data

Dec. 15, 1978 [GB] United Kingdom ............. 48667/78

[51] Int. Cl.³ ...................... B65H 59/38; B65H 63/02
[52] U.S. Cl. ..................................... 242/189; 226/195
[58] Field of Search ...................... 242/189, 190, 68.3, 242/75.3; 226/195, 60

[56] References Cited

U.S. PATENT DOCUMENTS

| | | | |
|---|---|---|---|
| 2,893,653 | 7/1959 | Schultheis | 242/189 |
| 3,258,214 | 6/1966 | Comstock | 242/201 X |
| 3,544,037 | 12/1970 | Arent | 242/189 |
| 3,545,695 | 12/1970 | Patton | 242/68.3 |
| 3,666,204 | 5/1972 | Gysling | 242/189 |
| 3,667,700 | 6/1972 | Carney et al. | 242/189 |
| 3,697,016 | 10/1972 | Leifer et al. | 242/189 |

Primary Examiner—Leonard D. Christian
Attorney, Agent, or Firm—Fleit & Jacobson

[57] ABSTRACT

A tape tension arm arrangement for selectively disposing a pair of tension rollers supported by respective tension arms in positions appropriate for tape loading or tape drive. Each tension arm is mounted on a pivoted rocker member which is coupled to a driving crank member by a connecting rod. The connecting rod engages the rocker member in such a manner that in the tape drive position the tension arm may move against a resilient bias towards the tape threading position, in response to an increase in the tension of the tape. A tape transport system is also described which includes a tape tension arm arrangement of the type described above and a reel mounting device for supporting a reel having an internal support surface. The reel mounting device includes three resiliently coupled reel mounting members each supported between symmetrically disposed pivot points. Each member has a resilient peripheral surface capable of frictionally engaging the internal support surface of the reel and a lever arm capable of releasing the reel from such engagement.

16 Claims, 4 Drawing Figures

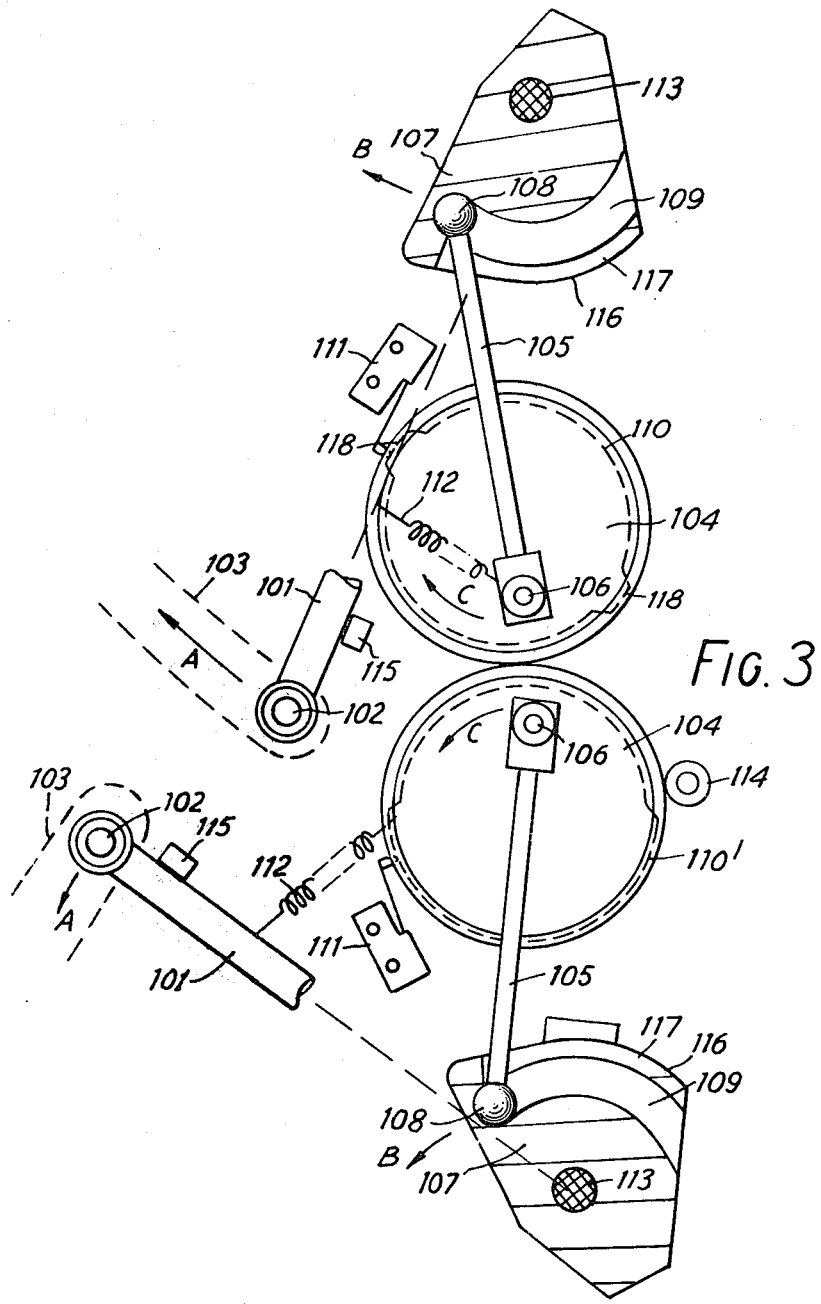

MAGNETIC TAPE HANDLER

This invention relates to an improved tape handling system which allows easier mounting of a tape reel and which provides a tension arm mechanism for easier tape transport.

According to one aspect of the invention there is provided a tape tension arm arrangement for selectively disposing a pair of tension rollers, supported by respective arms, in either a first position, appropriate for tape loading, or a second position, appropriate for tape drive, the rollers being resiliently biassed towards said second position but being capable, when in said second position, of moving against said bias in response to changes in the tension experienced by the tape, the arrangement comprising said rollers and said arms and, in addition thereto, a respective rocker member rigidly secured to each arm, each of said rocker members being capable of pivotal movement under the influence of a respective drive mechanism, each said drive mechanism comprising a crank member, a connecting rod, pivotally secured to the crank member and formed with a latch member arranged to co-operate with the respective rocker member to respond to movement of the crank members either to urge the respective arm against said bias to cause the respective roller to assume its first position or to allow said bias to cause the respective roller to assume its second position, said rocker members each being formed with means cooperating with said latching means to accommodate relative movement against said bias, between said rocker members and the drive mechanisms when said rollers assume said second position.

Preferably said bias is provided by a pair of bias members, extending from each of said tension arms to the associated crank members. The latch member is preferably spherical and may cooperate with a arcuate channel formed in the associated rocker member. The channel may comprise an arcuate cavity centred substantially at the pivot point of the rocker member and having a width and depth substantially equal to the diameter of said latch member. The cranks may be contra rotating meshing gear wheels and are preferably positioned between the rocker members.

According to another aspect of the invention there is provided a tape transport system comprising a pair of reel mounting devices for supporting reels having an internal support surface, a tape tension arm arrangement of the kind described above, and means for driving tape between the reels, one at least of the reel mounting devices comprising at least three reel mounting members each supported on a base plate between symmetrically disposed pivot points lying in a common plane, wherein each mounting member is resiliently coupled to an adjacent member outside the pivot points, has an end member having a resilient peripheral surface, and has a lever arm extending from one pivot point substantially towards another support member, wherein an introduced reel urges the end members into a hold position in which the said peripheral surfaces frictionally engage the internal support surface of the reel and the base plate supports each end member, and a release member is adapted to urge the lever arms towards the base plate against the action of the resilient coupling until they at least pass through the said common plane to a position in which the reel is not held by the peripheral surfaces which then project above the common plane.

According to a further aspect of the invention there is provided a reel mounting device for supporting a reel having an internal support surface comprising at least three reel mounting members each supported on a base plate between symmetrically disposed pivot points lying in a common plane, wherein each member is resiliently coupled to an adjacent member outside the pivot points, has an end member having a resilient peripheral surface, and has a lever arm extending from one pivot point substantially towards another support member, wherein an introduced reel urges the end members into a hold position in which the said peripheral surface frictionally engage the internal support surface of the reel and the base plate supports each end member, and a release member is adapted to urge the arms towards the base plate against the action of the resilient means until they at least pass through the said common plane to a position in which the reel is not held by the peripheral surfaces which then project above the common plane. Preferably each reel mounting member and the associated arm lever constitute a generally J-shaped bracket which is pivotally supported between pillars upstanding from the base plate. There may be three reel mounting members. Each end member may include an inset resilient member which forms part at least of said peripherial surface. The resilient member may be of rubber.

In order that the invention may be more clearly understood particular embodiments thereof are described with reference to the accompanying drawings, of which:

FIG. 3 shows a detailed plan view of the arm drive.

Figure 1:
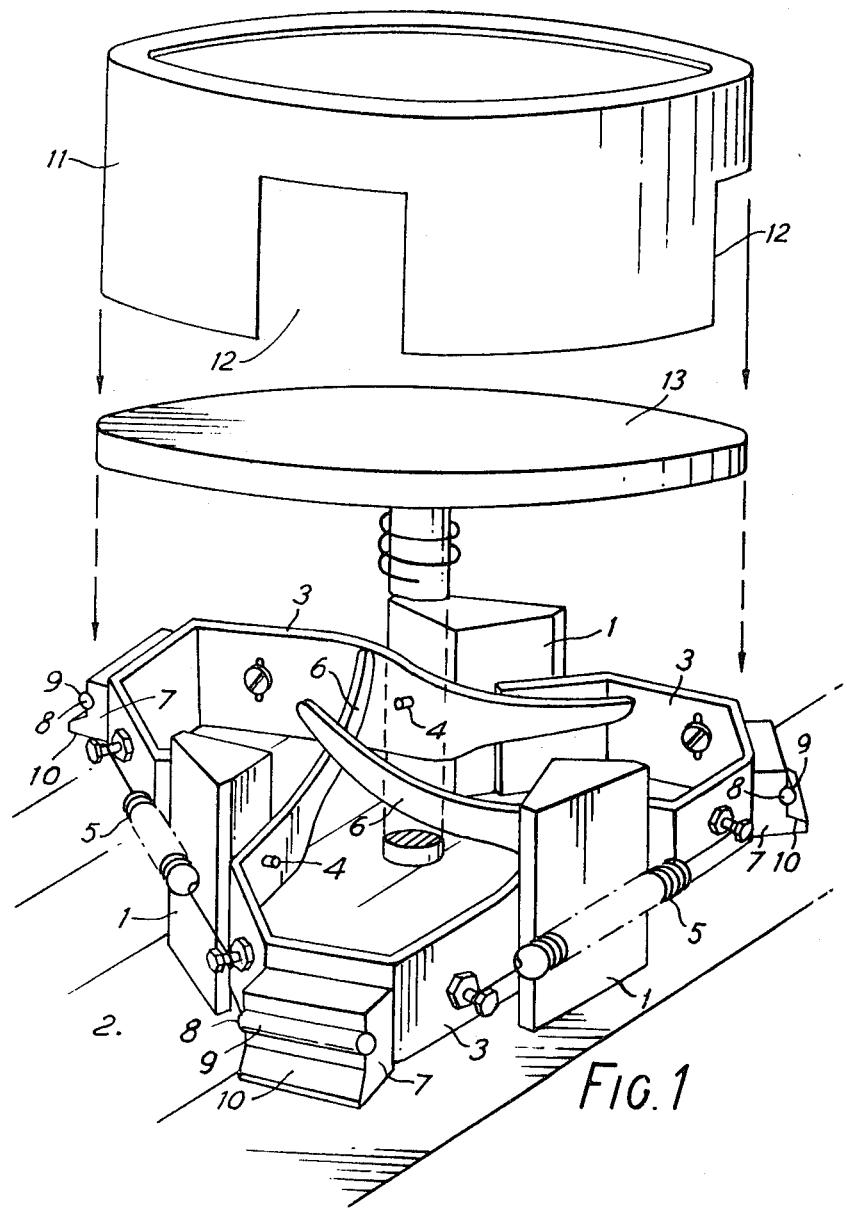
FIG. 1 illustrates an exploded perspective view of the reel mounting device.

Referring to FIG. 1, three symmetrically disposed pillars 1 are rigidly mounted on a base plate 2 and three identical J-shaped bracket members 3 are pivotally supported at 4 by respective pillars. Adjacent bracket members are resiliently coupled by springs 5. Each bracket member has an arm 6 extending from the pivot points 4 towards the opposite side of the device i.e., in the embodiment shown, into the area enclosed by the pillars, and an end member 7 located outside the pillars. Each end member has an inset frictional member 8 having a resilient peripheral surface 9 and a lip 10 extending radially outwards from the outer face of the end member 7. The frictional member could, for example, be a rod or block of rubber. It is desirable that, when unstressed, this peripheral surface is parallel to the outer face of end member 7.

In FIG. 1 the bracket members 3 are shown in an unstable equilibrium position in which points of attachment of the springs to adjacent pairs of bracket members are substantially in the same plane as the pivots 4.

The device is stable in a release position, however, when the bracket members are tilted so that the arms 6 are supported by the base plate. In this position, a reel introduced over the pillars initially engages the lips 10 of the raised end members, urging them downwards to overcome the increasing tension in the springs. Once the brackets have passed through the position shown in FIG. 1, however, the end members are urged downwardly to rest against the base plate in another stable position. This movement causes the frictional members 8 to be compressed against the inner surface of the reel, distorting surface 9 from a straight to curved shape thereby maintaining said inner surface firmly against the peripheral surface 9 in the "hold position". The bracket arms 6 then project upwards through the plane formed by the tops of the pillars. By depressing the ends of the arms the end members are raised to move upwards to again assume the release position thereby releasing the reel (in a peeling action) from the frictional hold of the peripheral surface.

In a particular embodiment, the pillars are surrounded by a collar 11 having apertures 12 through which each end member may project. A release member 13 is positioned within the collar by a central pillar which engages in a socket at the centre of the hub, and carries a spring which normally maintains the release member clear of the arms 6.

Pressure applied to the release member against the spring causes contact with the ends of the bracket arms in the hold position, thereby effecting the release of a supported reel.

This arrangement provides a quick release mechanism and is particularly useful for one handed operation.

Figure 2A:
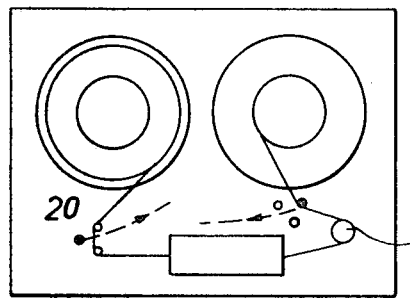
FIG. 2a and 2b illustrate a plan view of a recording unit.
Figure 2B:
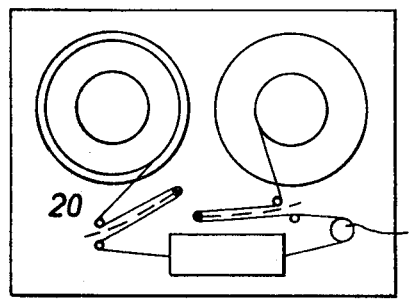

Referring to FIGS. 2a and 2b, the full circles indicate the positions of tension rollers which are supported at the ends of two tension arms, and the open circles indicate the positions of fixed rollers. The tension arms themselves and the arm drive to which they are attached are hidden from view by the front cover 20 of the recording unit, but are shown in detail in FIG. 3. As will be explained below the dashed lines in FIGS. 2a and 2b represent the paths of the two tension rollers during operation of the tape transport. A driving capstan for the tape is shown at 30.

In FIG. 2a the tension rollers are shown in their respective tape threading positions, the tape being laced around the rollers in the manner illustrated. To locate the tape for operation of the recorder the arm drive is activated, thereby urging the tension rollers along the paths indicated by the dashed lines, to respective "stop positions" shown in FIG. 2b.

As will be explained in greater detail below, each tension arm is resiliently biassed towards its respective "stop position" and each tension arm may move back towards the tape threading position against this bias, in response to a change in tension of the tape, as occasioned for example, in a high speed transport, by starting or reversing the drive to the capstan. This arrangement, therefore, provides a buffer between the spooled and unspooled sections of tape and ensures that only the relatively short section of tape between the two tension rollers experiences a sudden acceleration.

Referring now to FIG. 3, the tension arms are shown (in part) at 101 and are each fixed to pivot with a respective rocker member 107 about a respective pivot point 113. A tension roller 102 is mounted at the end of each tension arm 101 and protrudes through the slot in the recorder front cover, the slot being represented schematically by the dotted lines 103. FIG. 3 shows the rollers 102 in their respective "stop positions" described above.

During operation of the tape transport, the rollers may move along the slots 103 but are limited in the extent of their movement in one direction by stops 115 which engage the tension arms, as shown in FIG. 3, and prevent movement of the rollers beyond their respective "stop positions".

The drive to the tension arms is supplied by a pair of meshing crank wheels 104 which are positioned between the rocker members 107 and are driven by a motor engaging one of the wheels through a pinion 114. It will be appreciated that the motor could engage either wheel.

A respective connecting rod 105 is pivoted to each wheel by a respective pin 106 and has a respective coupling member 108 which, as shown in FIG. 3, engages a correspondingly shaped socket set into the edge 116 of the respective rocker member. For clarity FIG. 3 shows a section through each rocker member 107 in a plane parallel to that of the recorder front cover. The socket forms part of an arcuate channel 109 within which the coupling member 108 may be accommodated. The coupling member is freely maintained within the channel by flanges 117 which overhang the edge 116.

In the position shown in FIG. 3, each tension arm rests hard against its respective stop 115. Further slight rotation of the crankwheels, in the direction of the arrows C causes each pin 106 to attain its most distant position from its respective pivot point 113. Each rocker member and associated tension arm is, of course, prevented from responding to this further movement by the stop 115 and so each coupling member 108 disengages its respective socket and assumes a position within the channel 109. In this position each tension arm is free to move back towards the tape threading position against the action of a respective biassing spring 112 in response, for example, to an increase in the tension of a threaded tape. When the tension rollers assume the "stop position" however, the biassing springs 112 are arranged to exert a force on the tension arms in a direction substantially perpendicular to the length thereof, and in dependence on the position of each stop 115 connects a tension arm either to the pin 106 of the crankwheel or to the body of the crankwheel itself.

Further rotation of the crankwheels causes each coupling member to re-engage the respective socket and to urge the rocker members in the direction of arrow B about their repsective pivot points 113. This movement causes the tension arms to swing away from the crank wheels and causes the rollers to move in the direction of the arrows A towards the tape threading position, as shown in FIG. 2a. The rollers attain the tape threading position when the pins 106, have reached the position of closest approach to the pivot points 113 and in this position the rotation is stopped. Further rotation of the crankwheels in the direction of arrows C then permits each tension arm, and its associated roller, to move under the influence of the biassing springs 112 back toward the stop position. In this manner the biassing springs urge the socket into engagement with the coupling member 108.

The drive to the crank wheels is stopped whenever the pins 106 have reached their closest or most distance positions to or from the pivot points 113 i.e. when the tape rollers respectively assume the stop and tape threading positions. In the present arrangement this is achieved using shaped cams 110 and 110′, which are attached to the cranks 104 and which on rotation activate switches 111 to stop the motor at a desired position. The cam 110 has two diametrically opposed circumferential projections 118 which correspond to the most distant position from, or the closest position to, the pivot point 113. Thus when the pin 106 attains the most distant position from pivot point 113 the switch 111 opens as its contact disengages a projection thereby stopping the motor. A signal produced, for example, by closing a switch then reactivates the motor which causes rotation of the cranks until the contact member disengages the other projection on the cam 110. A similar switch senses a circumferential projection on the other cam 110' and thereby ascertains the position of the tension arm i.e. whether it has been stopped at the tape threading or stop position. If it is sensed that the tension arm has been stopped at the tape threading position a suitable control signal may be supplied which reactivates the motor after a predetermined delay. Clearly, however, the relative dispositions of the projection may be chosen to suit a desired mode of operation.

Using the above described arrangement the need for cords and cables, which tend to stretch and wear, has been obviated. Although a specific embodiment has been described it will be appreciated that other embodiments are also encompassed by the invention.

What we claim is:

1. A tape tension arm arrangement comprising,
a pair of spaced rocker members, each pivotally mounted for rotation about a fixed axis,
a respective tension arm rigidly secured to each rocker member,
a tension roller mounted to each said tension arm,
a respective drive mechanism, associated with each said tension arm, comprising a crank member, a connecting rod pivotally mounted to the crank member and a coupling member fixedly mounted to said connecting rod and adapted to be moveably connected to the respective rocker member, and
biassing means for urging the tension arms towards a first position appropriate for tape drive,
the tension arms being capable, when disposed in said first position, of moving against the biassing action of said biassing means in response to changes in the tension experienced by a threaded tape,
and the said coupling means being adapted to co-operate with a respective rocker member in response to movement of the crank members either to urge the respective arms against said biassing action, to cause them to assume a second position, appropriate for tape threading, or to allow said biassing means to cause the respective arms to assume said first position.

2. An arrangement according to claim 1 wherein said biassing means comprises a pair of bias members, extending from each of said tension arms to the associated crank member.

3. An arrangement according to claims 1 or 2 wherein each coupling member is spherical and co-operates with an arcuate channel formed in the associated rocker member.

4. An arrangement according to claim 3 wherein said channel is comprised of an arcuate cavity centred substantially at the pivot point of the rocker member and having a width and depth substantially equal to the diameter of said coupling member.

5. An arrangement according to claim 3 wherein the coupling member is maintained within the channel by a flange.

6. An arrangement according to any one of claims 1 or 2 wherein the crank members are contra rotating meshing gear wheels.

7. An arrangement according to claim 6 wherein the crank members are positioned between the rocker members.

8. A tape transport system comprising a pair of reel mounting devices for supporting reels having an internal support surface, a tape tension arm arrangement according to any one of claims 1 to 7 and means for driving tape between the reels, one at least of the reel mounting devices comprising:
(a) a base plate,
(b) a least three symmetrically disposed support means mounted to the base plate,
(c) a mounting member, pivotally supported between, and mounted to, each pair of adjacent support means each mounting member including an end member having a resilient peripheral surface and a lever arm extending from one pivot point substantially towards another support member, and
(d) means for resiliently coupling each said member to an adjacent member outside the pivot points,
wherein an introduced reel urges the end members into a hold position in which said peripheral surfaces frictionally engage the internal support surface of the reel and the base plate supports each end member, and the device has a release member adapted to urge the arms towards the base plate aganist the action of the resilient means until they at least pass through the said common plane to a position in which the reel is not held by the peripheral surfaces which then project above the common plane.

9. A system according to claim 8 wheren there are three reel mounting members.

10. A system according to claim 8 wherein each end member includes an inset resilient member which forms a part at least of said peripheral surface.

11. A system according to claim 10 wherein the resilient member is of rubber.

12. A reel mounting device for supporting a reel having an internal support surface comprising,
(a) a base plate,
(b) at least three symmetrically disposed support means mounted to the base plate,
(c) a mounting member, pivotally supported between, and mounted to, each pair of adjacent support means each mounting member including an end member having a resilient peripheral surface and a lever arm extending from one pivot point substantially towards another support member, and
(d) means for resiliently coupling each said member to an adjacent member outside the pivot points,
wherein an introduced reel urges the end members into a hold position in which said peripheral surfaces frictionally engage the internal support surface of the reel and the base plate supports each end member, and the device has a release member adapted to urge the arms towards the base plate against the action of the resilient means until they at least pass through the said common plane to a position in which the reel is not held by the peripheral surfaces which then project above the common plane.

13. A reel mounting device according to claim 12 wherein each reel mounting member and the associated arm level constitute a generally -shaped bracket which is pivotally supported between pillars upstanding from the base plate.

14. A device according to claim 12 or 13 wherein there are three reel mounting members.

15. A device according to claims 12 or 13 wherein each end member includes an inset resilient member which forms a part at least of said peripheral surface.

16. A device according to claim 15 wherein the resilient member is of rubber.

* * * * *